United States Patent (10) Patent No.: US 6,246,879 B1
Segura et al. (45) Date of Patent: Jun. 12, 2001

(54) METHODS OF SHARING CAPABILITIES INFORMATION BETWEEN THE NODES OF TELECOMMUNICATIONS NETWORK

(75) Inventors: Louis Segura, St-Laurent; Benita Rosenzweig, Saint Laurent, both of (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/111,072

(22) Filed: Jul. 7, 1998

(51) Int. Cl.$^7$ .................................................. H04Q 7/20

(52) U.S. Cl. ..................... 455/446; 455/452; 370/400; 370/410; 370/522; 375/220

(58) Field of Search ..................... 370/466, 465, 370/410, 522, 400, 389, 469; 375/222, 220; 455/446, 452, 422, 433, 560, 561

(56) References Cited

U.S. PATENT DOCUMENTS 5,930,264 * 7/1999 Nguyen ................................. 370/466

FOREIGN PATENT DOCUMENTS

WO 95/30960   11/1995  (WO).

* cited by examiner

Primary Examiner—Dwayne Bost
Assistant Examiner—Miguel D. Green
(74) Attorney, Agent, or Firm—Smith, Danamraj & Youst, P.C.

(57) ABSTRACT

A method of sharing capabilities information between a plurality of nodes in a telecommunications network. The method begins when a new node is installed in the telecommunications network or the capabilities of a node are modified. The new or modified node sends an Exchange Data Directive (EXDATADIR) Invoke message to one or more cooperating nodes in the network. The EXDATADIR message is an intersystem node capabilities declaration message which includes parameters relating to communications capabilities and service support capabilities of the new or modified node. If the node is a new node, this is followed by sending EXDATADIR Return Result messages from each cooperating node to the new node. The EXDATADIR Return Result message is an intersystem node capabilities declaration message which includes parameters relating to services supported by the cooperating nodes. Upon receipt of a node capabilities declaration message, each node updates its exchange data with the parameters relating to the capabilities of the other nodes in the network.

2 Claims, 1 Drawing Sheet

METHODS OF SHARING CAPABILITIES INFORMATION BETWEEN THE NODES OF TELECOMMUNICATIONS NETWORK

BACKGROUND OF THE INVENTION

Technical Field of the Invention

This invention relates to telecommunication systems and, more particularly, to a method of sharing capabilities information between the nodes of a radio telecommunications network.

Description of Related Art

In cellular telecommunications networks, each network node includes exchange data which is utilized by the node to interface with other nodes in the network. The exchange data includes data relating to the communications protocols supported by each node in the network as well as service support capabilities. The introduction of any new node within a cellular telecommunications networks currently requires extensive modification to the exchange data of the existing nodes in the network which are to interact with the new node. In the same manner, the exchange data of the new node must also be created, and updated to include all the necessary information regarding the existing nodes in the network with which the new node will interface. The process of loading, updating, and verifying exchange data is not automated, and thus is manually intensive and error prone.

Existing solutions do not permit the validation or the automatic creation of the exchange data using current and valid information as provided in real-time by the network. In addition, two-way sharing of information is not taught or suggested in the prior art. PCT International Patent Application WO 95/30960 to Löfgren discloses an apparatus for providing to a master device, capability information corresponding to slave devices communicating therewith. The capability information is used by the master device for communicating with the slave devices. However, information is only sent one way (slave to master), and only information relating to the communications capabilities of the slave devices is sent.

In order to overcome the disadvantage of existing solutions, it would be advantageous to have a method of sharing capabilities information between the nodes of a telecommunications network. The present invention provides such a method.

SUMMARY OF THE INVENTION

In one aspect, the present invention is a method of sharing capabilities information between a plurality of nodes in a telecommunications network. The method begins when a new node is installed in the telecommunications network and includes sending a first node capabilities declaration message from the new node to a cooperating node in the network, the first message including parameters relating to communications capabilities of the new node. This is followed by sending a second node capabilities declaration message from the cooperating node to the new node, the second node capabilities declaration message including parameters relating to services which the cooperating node is capable of supporting. The second message may also include parameters related to additional communications capabilities of the cooperating node.

This is followed by updating the exchange data in each node with the parameters relating to the capabilities of the other nodes in the network.

In another aspect, the present invention is a method of sharing capabilities information between a plurality of nodes in a telecommunications network when the capabilities of a first node in the telecommunications network are modified. The method begins by sending a plurality of node capabilities declaration messages from the first node to a plurality of cooperating nodes in the network, the node capabilities declaration messages including parameters relating to communications capabilities and service support capabilities of the first node. This is followed by updating the exchange data in each of the cooperating nodes with the parameters relating to the modified capabilities of the first node. Each of the plurality of cooperating nodes then sends an acknowledgement message to the first node.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
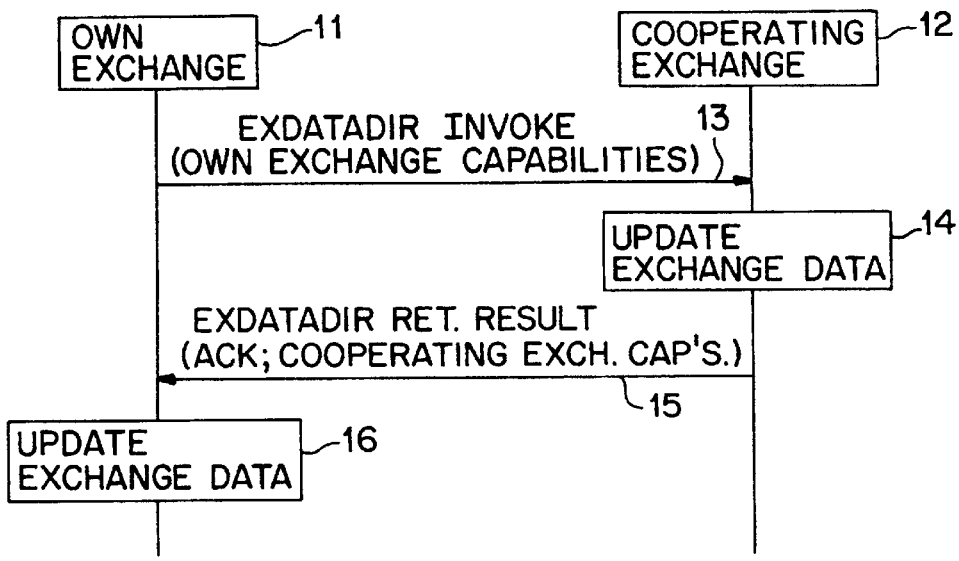
FIG. 1 is a message flow diagram illustrating the flow of messages in a cellular telecommunications network between a newly installed own exchange and an existing cooperating exchange when sharing information in a node capability declaration upon installation of the own exchange.

The present invention introduces new messages within an intersystem signaling protocol such as, for example ANSI-41, that simplify and automate much of the process of creating and updating exchange data in cellular network nodes. "Exchange data" includes data relating to the addresses, communications protocols, and service support capabilities of each node in the network, and may be applicable to a Mobile Switching Center (MSC), Short Message Service Message Center (MC), Home Location Register (HLR), Visitor Location Register (VLR), etc. Whenever a new node is introduced in the network, or is updated, the node declares its capabilities to the network in a process referred to as the "node capability declaration". The information that the new node declares may include, but is not limited to:

a) Node type by subsystem number (MSC, MC, HLR, VLR, etc.);
b) Destination address (network-cluster-member);
c) Functionality Supported;
d) Private Data supported/not supported;
e) A unique identifying number for each exchange, such as a Global Cooperating Exchange Number (GLEXM);
f) Signaling Protocol level supported (proprietary protocols, IS-41 rev.x, etc.); and
g) Air Interface Supported (i.e. Protocol Version, Hyperband).

Similarly, any existing nodes with which the new node interacts send the new node information regarding the capabilities of the responding existing nodes. This information is utilized to build up and validate the exchange data for the new node.

The invention is not limited to AMPS-type networks, but is also applicable to GSM or other core network signalling standards as well. This, in turn, simplifies production, lowers network operating costs, and reduces or eliminates manual exchange data production and maintenance. The automatic updating of cooperating exchange data tables to reflect modifications to exchange data decrease the possibility of errors in reproducing the data as well as alleviating the operator's task of entering the data manually.

Cooperating Exchange Data

This section describes the node capability declaration as it applies to cooperating exchange data. In cellular systems today, own exchange data and cooperating exchange data are entered by the operator in order to define the characteristics of the exchanges for roaming and handoff purposes. The administration of cooperating and own exchange data is controlled by a series of commands for defining, modifying, deleting and printing of exchange data. Cooperating exchange data may include, but is not limited to:

a) An end-of-selection code indicating the action taken for calls to an exchange's own roaming mobile subscriber (for example, re-routing to operator or to the visited exchange);
b) A global cooperating exchange number used to identify the own exchange in all the signaling networks (GLEXM);
c) A roaming type (i.e., automatic or manual);
d) A designation indicating the exchange identity in the signaling network (EXM);
e) A signaling protocol to be used for a specific exchange;
f) A functionality indicator denoting the capabilities of the cooperating exchange for:
   Private data supported/not supported
   Busy information suppressed/not suppressed
   Global title addressing supported/not supported
   Pre-routing call setup supported/not supported
   Page response messages supported/not supported
   Redirection request supported/not supported
   Local access barring supported/not supported
   Authentication supported/not supported
   Information Forward message supported/not supported
   Paging prior to acknowledge supported/not supported; and
g) A routing interrogation code used as an indication of how to treat call to HLR subscriber roaming to a cooperating exchange. For example, call barring, routing announcement.

Self-Identification upon Installation

The information defining the own exchange and all cooperating exchanges forms part of the exchange data which is loaded into the own exchange when it is first put into operation. In addition, all the cooperating exchange databases are updated to reflect the introduction of the new exchange into the cellular network. In order to minimize operator intervention and reduce the possibility of errors in reproducing the cooperating exchange data, a new node identifies itself and declares its capabilities to the cellular network upon installation. In turn, the cooperating exchanges automatically update their databases. Furthermore, the newly installed exchange receives the exchange data from all cooperating exchanges and populates its own cooperating exchange database accordingly.

At the installation of a new exchange, the minimum cooperating exchange data required to communicate with the existing exchanges in the network must be maintained within the new exchange. The minimum cooperating exchange data is the protocol to be used for each specific destination, whether a proprietary protocol or an IS41 protocol revision.

This information is maintained for interoperability purposes. The cooperating exchange destination parameters for the Message Transfer Part (MTP) and Signalling Connection Control Part (SCCP) are expressed as network, cluster, and member codes, and should be provided in the exchange data of the new exchange. The remaining exchange data is declared by the new exchange to the cooperating exchanges when the new exchange is brought into service. At this time, the newly installed exchange also receives the remaining exchange data from the cooperating exchanges.

FIG. 1 is a message flow diagram illustrating the flow of messages in a cellular telecommunications network between a newly installed own exchange 11 and an existing cooperating exchange 12 when sharing information in a node capability declaration upon installation of the own exchange. In this embodiment, the ANSI-41 intersystem signaling protocol is utilized to transfer the exchange information from one exchange to another, although other intersystem signaling protocols may be utilized and remain within the scope of the present invention. Upon installation, the own exchange 11 forwards a Transaction Capabilities Application Part (TCAP) Invoke message 13 to the cooperating exchange and includes parameters defining the capabilities of the own exchange. The identification portion of the TCAP message identifies the message as an Exchange Data Directive (EXDATADIR) Invoke message. In response, the cooperating exchange updates its exchange data at 14 and returns a EXDATADIR Return Result message 15 acknowledging the declaration of capabilities, and providing the capabilities of the cooperating exchange to the own exchange. The capabilities reported may include services supported by the cooperating exchange and additional communications capabilities. The own exchange then updates its exchange data at 16.

Self-Identification during Operation

Following installation, there are times when there is a need to update the cooperating exchange data as a result of modifications in the capabilities of one or more network nodes. Revisions to the own exchange data must be reflected in all cooperating exchange databases and is, currently, entered manually by the operator. In the first embodiment of the present invention, this is accomplished automatically by sending a EXDATADIR Invoke message defining the modified node capability parameters from the own exchange to the existing cooperating exchanges whenever an update is introduced by the operator in the own exchange. In turn, the cooperating exchanges revise their databases accordingly and acknowledge the receipt of the information with an EXDATADIR return result message to the originating own exchange.

Figure 2:
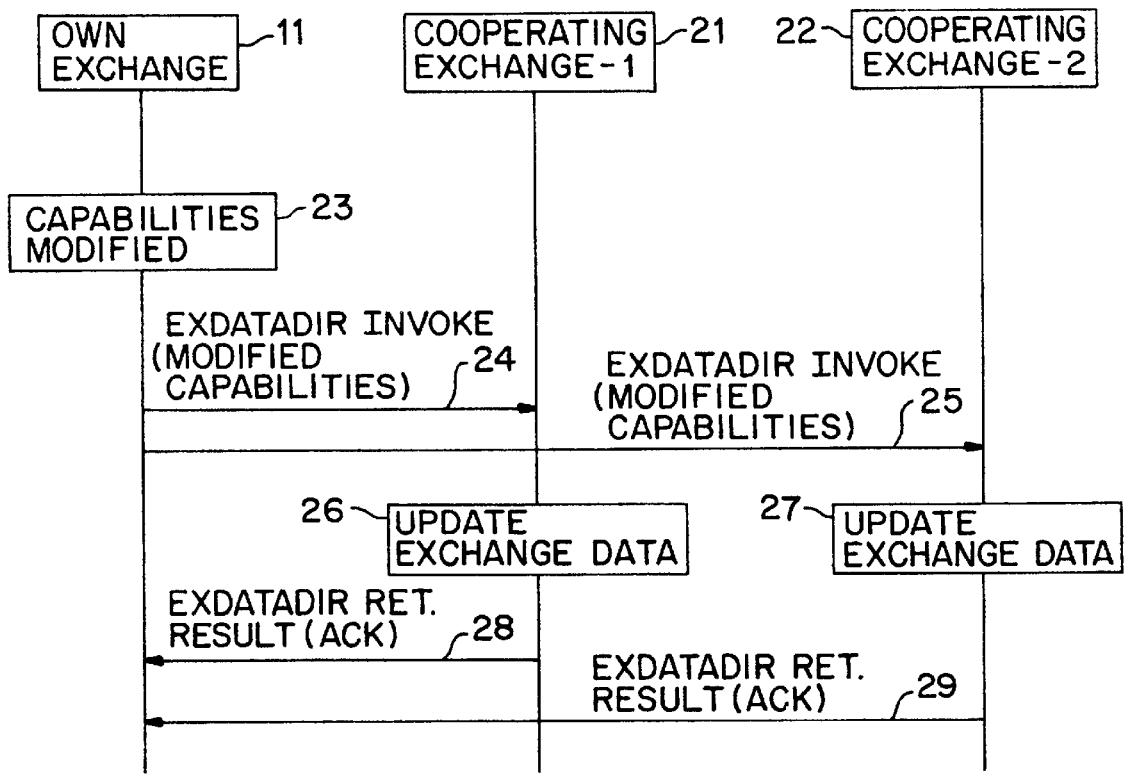
FIG. 2 is a message flow diagram illustrating the flow of messages between the own exchange and a plurality of cooperating exchanges when sharing information in a node capability declaration following a capabilities update of the own exchange during operation.

FIG. 2 is a message flow diagram illustrating the flow of messages between the own exchange 11 and a plurality of cooperating exchanges 21 and 22 when sharing information in a node capability declaration following a capabilities update of the own exchange during operation. At 23, the system operator changes the capabilities of the own exchange. The own exchange automatically sends an EXDATADIR Invoke message 24 to the first cooperating exchange (Cooperating Exchange-1) 21 and includes the modified node capabilities in the message parameters. The own exchange also sends an EXDATADIR Invoke message 25 to the second cooperating exchange (Cooperating Exchange-2) 22 and includes the modified node capabilities in the message parameters. At 26, Cooperating Exchange-1 updates its exchange data, and at 27, Cooperating Excbange-2 updates its exchange data with the new capabilities information. Cooperating Exchange-1 then sends an EXDATADIR return result message 28 to the own exchange with an acknowledgement of the modified capabilities.

Cooperating Exchange-2 also sends an EXDATADIR return result message 29 to the own exchange with an acknowledgement of the modified capabilities.

Closed-Loop Mode of Operation

In the closed-loop mode of operation, the node capability declaration function sets the cooperating exchange data by updating the exchange database automatically in accordance with pre-defined constraints. In this mode, a validation check of the data may be performed prior to inserting the data in the cooperating exchange database. For example, if a parameter is present which indicates that the cooperating exchange is capable of sending and receiving Information Forward messages, this parameter can be verified against the indicated signaling protocol version supported by the cooperating exchange. The Information Forward message is only available in network nodes supporting IS41 revision C and up. In addition, the GLEXM and EXM designations must be unique and this, too, can be verified.

Interoperability

Some existing nodes within the network may not recognize the new parameters of the EXDATADIR Invoke message which define node capabilities. These existing nodes must continue to have their cooperating exchange data tables updated manually by the operator. For interoperability purposes, the network nodes complying with the forward compatibility requirements of ANSI-41D (formerly Technical Service Bulletin 55 (TSB 55)) send an EXDATADIR Reject Response message upon receipt of an unknown message. Also, additional unknown parameters or additional parameters with unrecognized values received by an end network node are discarded in accordance with the ANSI-41 forward compatibility requirements. Intermediate network nodes forward the additional parameters transparently through the network to the end node.

As noted above, parameters indicating the address of each cooperating exchange and the signaling protocol to be used for each cooperating exchange are defined in the exchange data as part of the cooperating exchange database. Therefore, the newly installed own exchange is aware of the correct intersystem signaling protocol used for communication with each of the existing cooperating exchanges. Also, during operation, an indication of the signaling protocol is maintained within the cooperating exchange database. Thus, the ANSI-41 node capability declaration (EXDATADIR) message is only sent to cooperating exchanges which implement the ANSI-41 protocol versions capable of recognizing the message and utilizing the capabilities parameters.

It is thus believed that the operation and construction of the present invention will be apparent from the foregoing description. While the method shown and described has been characterized as being preferred, it will be readily apparent that various changes and modifications could be made therein without departing from the spirit and scope of the invention as defined in the following claims.

What is claimed is:

1. A method of sharing capabilities information between a plurality of nodes in a telecommunications network comprising:

installing, or modifying the capabilities of, a node in the telecommunications network;

sending a first node capabilities declaration message comprising an Exchange Data Directive (EXDATADIR) Invoke message from the node to a cooperating node in the network, said EXDATADIR Invoke message including parameters relating to communications capabilities of the node and parameters related to services which the node is capable of supporting; and sending a second node capabilities declaration message from the cooperating node to the node, said second message including parameters related to services which the cooperating node is capable of supporting.

2. A method of sharing capabilities information between a plurality of nodes in a telecommunications network comprising:

installing, or modifying the capabilities of, a node in the telecommunications network;

sending a first node capabilities declaration message from the node to a cooperating node in the network, said first message including parameters relating to communications capabilities of the node and parameters related to services which the node is capable of supporting; and sending a second node capabilities declaration message from the cooperating node to the node, said second message including an Exchange Data Directive (EXDATADIR) Return Result message which includes parameters related to services which the cooperating node is capable of supporting.

\* \* \* \* \*